(12) United States Patent
Wu

(10) Patent No.: US 10,011,319 B2
(45) Date of Patent: Jul. 3, 2018

(54) BICYCLE BRAKE ASSISTING APPARATUS

(71) Applicant: Dong-Her Wu, Changhua (TW)

(72) Inventor: Dong-Her Wu, Changhua (TW)

( * ) Notice: Subject to any disclaimer, the term of this patent is extended or adjusted under 35 U.S.C. 154(b) by 0 days.

(21) Appl. No.: 15/414,567

(22) Filed: Jan. 24, 2017

(65) Prior Publication Data

US 2018/0072371 A1    Mar. 15, 2018

(30) Foreign Application Priority Data

Sep. 14, 2016   (TW) .............................. 105129983 A

(51) Int. Cl.
   *B62L 3/08*   (2006.01)
   *B62L 3/02*   (2006.01)
   *B62L 1/00*   (2006.01)

(52) U.S. Cl.
   CPC ................. *B62L 3/08* (2013.01); *B62L 1/005* (2013.01); *B62L 3/02* (2013.01)

(58) Field of Classification Search
   CPC ...... B62L 1/14; B62L 3/08; B62L 3/02; B62L 3/00; B60T 11/06; B60T 11/046

USPC .......................................... 188/24.22, 24.21
See application file for complete search history.

(56) References Cited

U.S. PATENT DOCUMENTS

| 2002/0175028 A1* | 11/2002 | Liu | ...................... B60T 11/046 |
| | | | 188/24.21 |
| 2012/0192669 A1* | 8/2012 | Lo | ......................... B60T 11/046 |
| | | | 74/471 R |
| 2014/0202802 A1* | 7/2014 | Chang | ....................... B62L 3/08 |
| | | | 188/204 R |

* cited by examiner

*Primary Examiner* — Xuan Lan Nguyen
(74) *Attorney, Agent, or Firm* — Che-Yang Chen; Law Offices of Scott Warmuth

(57) ABSTRACT

A bicycle brake assisting apparatus may comprise a main body, a traction apparatus, two control cable members, a rear brake tube, and a front brake tube, and the traction apparatus further comprises an operating block and a rotating piece which are pivotally connected with each other. The bicycle brake assisting apparatus of the present invention is configured to achieve the effect of stopping the rear wheel of the bicycle first and concurrently stopping the rear wheel and the front wheel of the bicycle thereafter regardless of pulling a left brake lever, a right brake lever, or both of the brake levers of a bicycle, thus increasing safety of use for a cyclist.

4 Claims, 11 Drawing Sheets

BICYCLE BRAKE ASSISTING APPARATUS

FIELD OF THE INVENTION

The present invention relates to a bicycle brake assisting apparatus more particularly to a bicycle brake assisting apparatus capable of stopping a rear wheel of a bicycle first and concurrently stopping the rear wheel and a front wheel of the bicycle thereafter.

BACKGROUND OF THE INVENTION

Referring to FIGS. 10 to 12 or a Taiwanese patent, No. M374432, a conventional brake base comprises a cover (50), and a upper end thereof has two inlet holes (501)(502) are configured to be respectively penetrated by two brake wires and to engage with two connecting sleeves (51)(52) respectively. Two sliding surfaces (503)(504) are respectively formed at two lateral inner surfaces of the cover (50), and an interior space of the cover (50) is configured to install a sliding frame (60). Moreover, two outlet holes (505)(506) formed at a bottom portion of the cover (50) are configured to be penetrated by two adjusting bolts (53)(54) respectively. Two parallel planes (601)(602) respectively formed at two lateral ends of the sliding frame (60) are configured to respectively couple with the sliding surfaces (503)(504). Furthermore, the sliding frame (60) comprises two screw holes (603)(604) which are configured to be penetrated by two fixing bolts (61)(62), and the fixing bolts (61)(62) are configure to engage with two fixing nuts (63)(64) respectively after penetrating through the screw holes (603)(604). In addition, two block surface (605)(606) respectively formed at two sides of a central portion of the sliding frame (60) are configured to block a operating lever (70). Also, a fixing hole (607) is formed at a lower portion of the sliding frame (60), and a central portion of the operating lever (70) comprises a central hole (701). As a result, a mounting bolt (65) is configured to sequentially penetrate through the fixing hole (607) and the central hole (701), thus securing the sliding frame (60) with the operating lever (70) through a mounting bolt (65). Wherein a central portion of the operating lever (70) has a central hole (701) which is configured to be penetrated by the mounting bolt (65), thus connecting the sliding frame (60) with the operating lever (70). Moreover, a first housing slot (702) and a second housing slot (703) are respectively formed at two lateral sides of the central hole (701).

According to the components mentioned above, the cover (50) has the two inlet hole (501)(502) which are respectively engaged with the two connecting sleeves (51)(52) configured to be penetrated by a left brake outer tube (80) and a right brake outer tube (81) respectively. Wherein left steel wire (801) and right steel wire (811) respectively penetrating through interior spaces of the left brake outer tube (80) and the right brake outer tube (81) respectively penetrate through two through holes (611)(621) respectively formed on the fixing bolts (61)(62) and are firmly secured by the fixing nuts (63)(64). Two head portions of the left steel wire (801) and right steel wire (811) are respectively engaged with a left brake lever and a right brake lever. The two outlet holes (505)(506) formed at the bottom portion of the cover (50) are configured to be penetrated by the two adjusting bolts (53)(54) and be secured by two screw nuts (55)(56) respectively. Then, a front brake outer tube (82) and a rear brake outer tube (83) are respectively positioned inside two lower portions of the two adjusting bolts (53)(54), and a front steel wire (821) and a rear steel wire (831) respectively penetrate through two interior spaces of the front brake outer tube (82) and the rear brake outer tube (83). Thereafter, two head portions of the front steel wire (821) and the rear steel wire (831) are respectively positioned and coupled inside the first housing slot (702) and the second housing slot (703) of the operating lever (70), and two tail portions of the front steel wire (821) and the rear steel wire (831) are respectively coupled with a front brake and a rear brake.

When the right brake lever is pulled, the right steel wire (811) is driven to pull the sliding frame (60), the mounting bolt (65), and operating lever (70), and then the rear steel wire (831) and the front steel wire (821) are concurrently driven by the operating lever (70), thus allowing the front and rear brake to brake a front and rear wheels concurrently. Moreover, a lever arm between the first housing slot (702) and the central hole (701) is longer than a lever arm between the second housing slot (703) and the central hole (701), thus allowing the operating lever (70) to output more force to the rear brake. As a result, when the right brake lever is fully pulled, the rear brake is configured to stop the rear wheel before the front brake stops the front wheel, thus increasing safety of use for a cyclist. Moreover, the left brake lever has the same effect as the right brake lever to prevent accidents.

However, the conventional bicycle brake apparatus is disadvantageous because: the left steel wire (801) and the right steel wire (811) are configured to pull the sliding frame (60) upwardly at eccentric positions such that the sliding frame (60) is tilted during the pulling process. Since the two planes (601)(602) are configured to bear against the two sliding surfaces (503)(504) of the cover (50) respectively, the tilted motions of the sliding frame (60) are configured to lead the sliding frame (60) to excessively rub against the inner surfaces of the cover, thus affecting the function of the bicycle brake apparatus and increasing accident risks. Therefore, there remains a need for a new and improved design for a bicycle brake assisting apparatus to overcome the problems presented above.

SUMMARY OF THE INVENTION

The present invention provides a bicycle brake assisting apparatus which comprises a main body, a traction apparatus, two control cable members, a rear brake tube, and a front brake tube, and the traction apparatus further comprises an operating block and a rotating piece which are pivotally connected with each other. The main body has a front surface and a rear surface, and the front surface has a concave portion to form a compartment inside the main body. After positioning the traction apparatus into the compartment and completing the installation of the control cable members, the rear brake tube, and the front brake tube, a cover is coupled with the front surface to close the compartment. Moreover, a vertical elongated second guiding groove is formed at a central portion of the cover on an inner surface thereof, and the main body has a vertical elongated first guiding groove formed on an inner surface of a rear wall thereof at a position corresponding to the second guiding groove. Two adjacent first through holes, which are parallel in a left-right direction vertically and downwardly penetrate through an upper portion of the main body to communicate with the compartment. Furthermore, a second through hole and a third through hole, which are adjacent in a front-rear direction, vertically and respectively penetrate through a central portion of the main body to communicate with the compartment. The operating block has a front end and a rear end, and a central shaft protrudes from a central portion of the front end and a central portion of the rear end concurrently. When the operating block is positioned into the compartment of the main body, the central shaft is configured to couple with the first guiding groove and the second guiding groove, thus installing the operating block in the compartment. Since a position of the operating block is limited by the first guiding groove and the second guiding groove, the operating block is configured to have limited upward and downward movements inside the compartment. In addition, two first engaging holes are formed on a top edge of the operating block at both sides of a central portion of the top edge, and a bottom edge of the operating block has a second engaging hole. Two cutting edges formed at a lower portion of the operating block are respectively located at both sides of the second engaging hole. An elongated hole horizontally penetrates the rotating piece, and wherein the elongated hole is vertically extended from a central portion of the rotating piece toward an upper portion thereof. Additionally, the rotating piece has a third engaging hole formed at a lower edge thereof. The elongated hole is configured to be penetrated through by the central shaft such that the rotating piece is configured to pivotally connect with the operating block inside the compartment of the main body. Moreover, the rotating piece is configured to couple against the front end of the operating block and to locate at a position adjacent to the cover. Each of the two control cable members has a control cable penetrating therethrough from one end to the other end, and each of the two control cables is connected to a brake lever at one end. Furthermore, the other end of the control cable is configured to penetrate through the first through hole of the main body into the compartment and to engage with the first engaging hole of the operating block. The rear brake tube comprises a rear brake wire penetrating therethrough from one end to the other end, and one end of the rear brake wire is connected to a rear brake while the other end thereof is configured to penetrate through the second through hole of the main body into the compartment and to engage with the second engaging hole of the operating block. The front brake tube has a front brake wire penetrating therethrough from one end to the other end, and one end of the front brake wire is connected to a front brake while the other end thereof is configured to penetrate through the third through hole into the compartment and to engage with the third engaging hole of the rotating piece.

Comparing with conventional bicycle brake apparatus, the present invention is advantageous because: (i) when a user pulling either the left brake lever or the right brake lever, the operating block is configured to smoothly be pulled upwardly without rubbing against or been stuck with the main body; (ii) with the pivotal connection between the main body and the traction apparatus, the bicycle brake assisting apparatus of the present invention is configured to be assembled and dissembled simply and quickly, thus reducing the cost of use; (iii) the bicycle brake assisting apparatus of the present invention is configured to achieve the effect of stopping the rear wheel of the bicycle first and concurrently stopping the rear wheel and the front wheel of the bicycle thereafter, thus increasing safety of use for a cyclist; (iv) the bicycle brake assisting apparatus of the present invention is configured to achieve the same effect mentioned in (iii) regardless of pulling the left brake lever, the right brake lever, or both of the brake levers; and (v) with pivotally connected with the operating block, the rotating piece is configured to be guided with a direction when pulled upwardly, thereby preventing the front brake wire from being pulled toward a side direction and the damage of components.

DETAILED DESCRIPTION OF THE INVENTION

Figure 1:
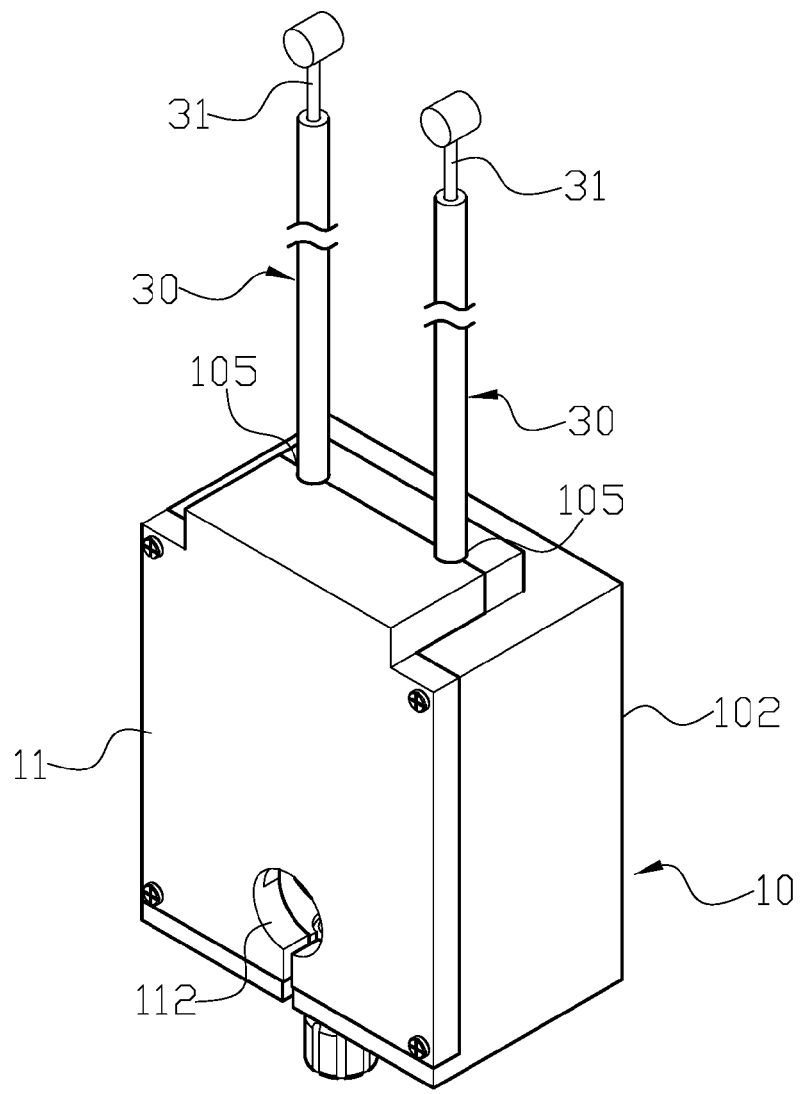
FIG. 1 is a three-dimensional assembly view of a bicycle brake assisting apparatus of the present invention.
Figure 3:
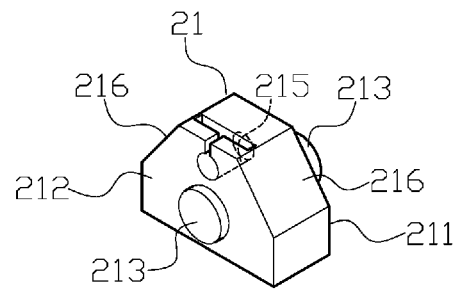
FIG. 3 is a three-dimensional assembly view of an operating block of the bicycle brake assisting apparatus in the present invention from another angle.
Figure 2:
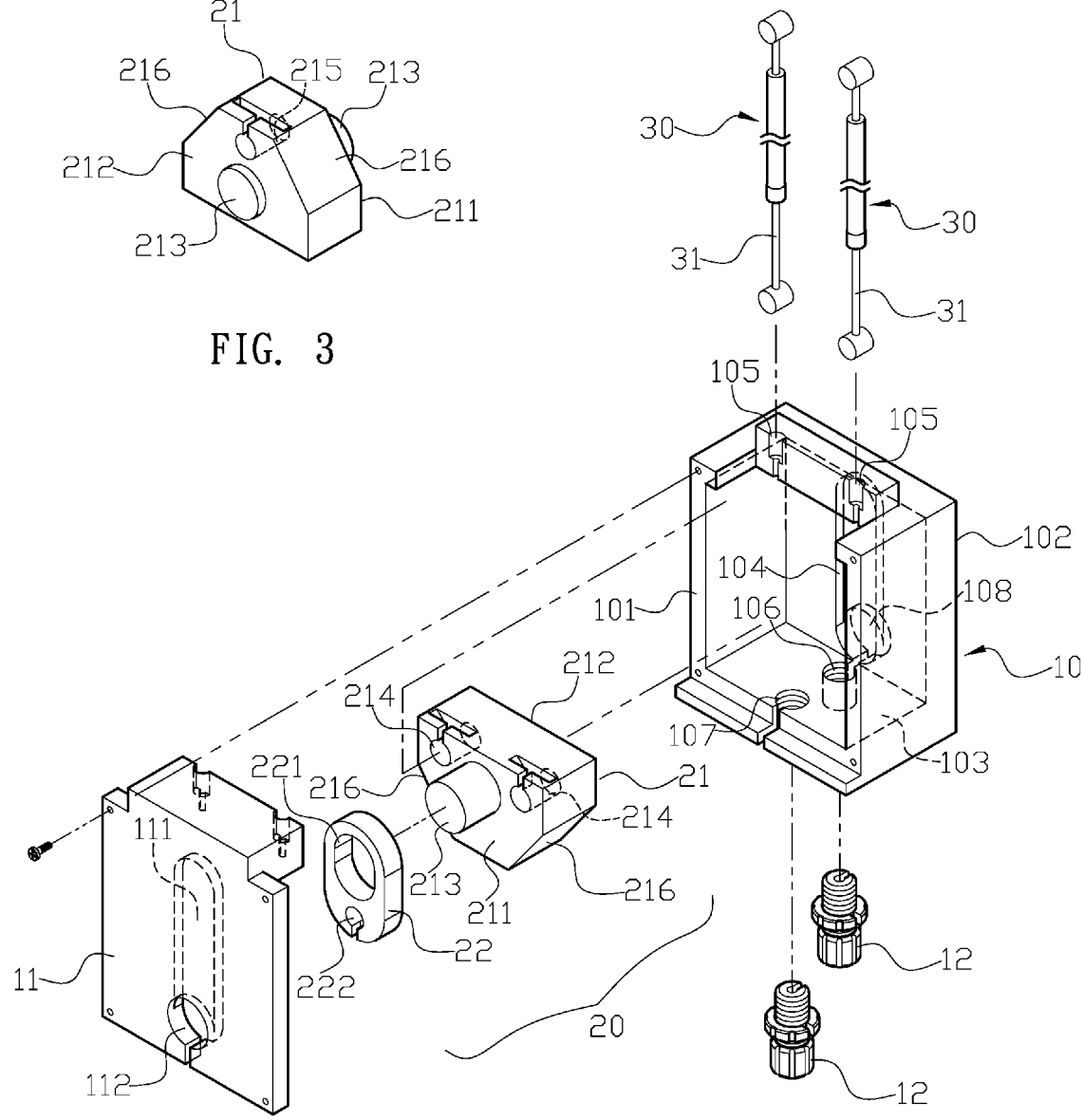
FIG. 2 is a three-dimensional exploded view of the bicycle brake assisting apparatus of the present invention.
Figure 4:
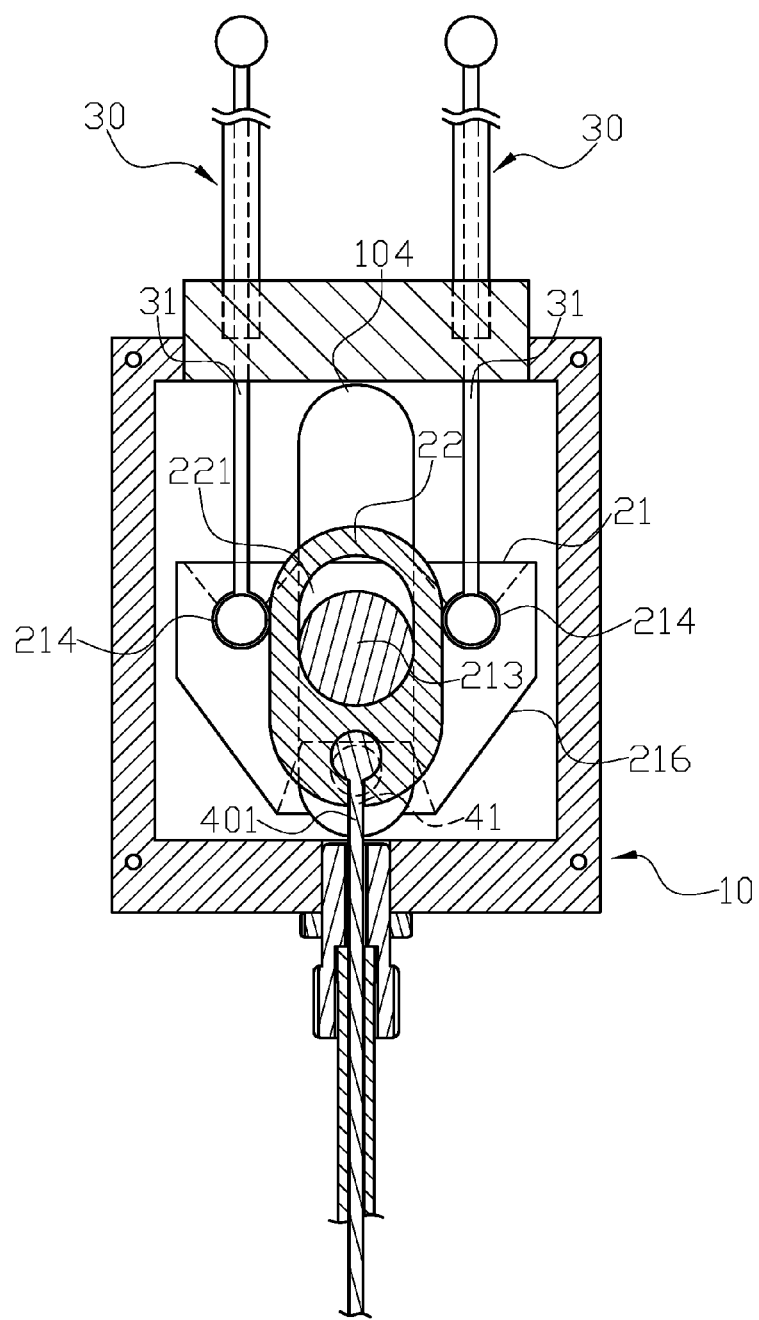
FIG. 4 is a sectional assembly view of the bicycle brake assisting apparatus of the present invention.
Figure 5:
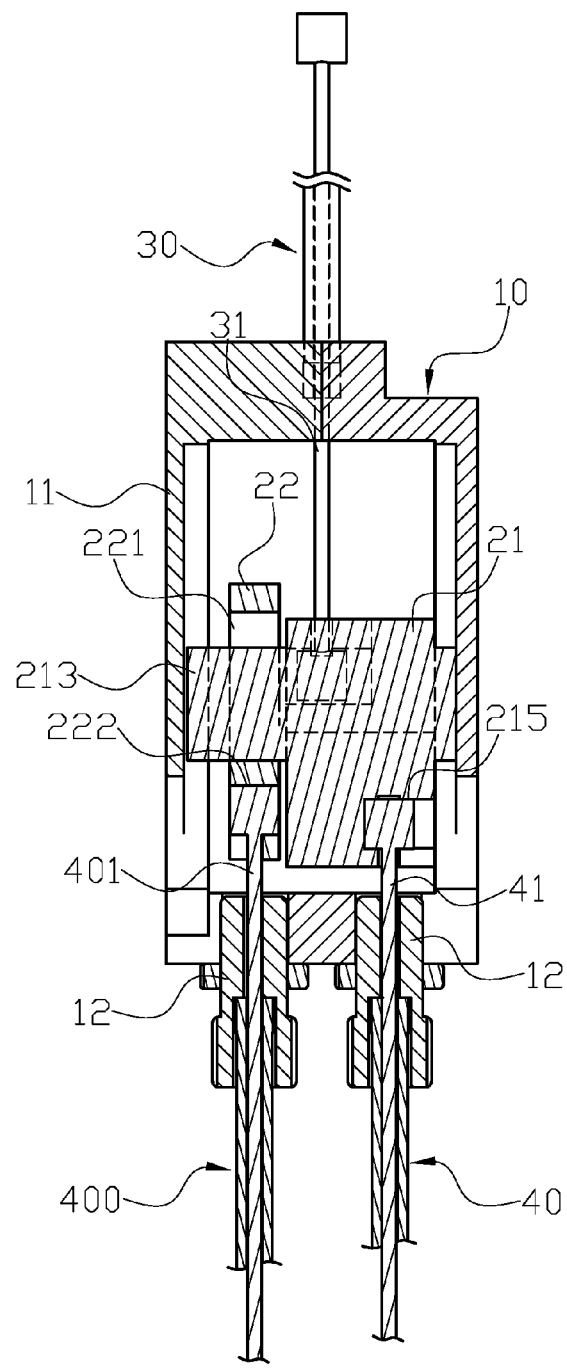
FIG. 5 is a sectional assembly view from another angle of the bicycle brake assisting apparatus of the present invention.
Figure 6:
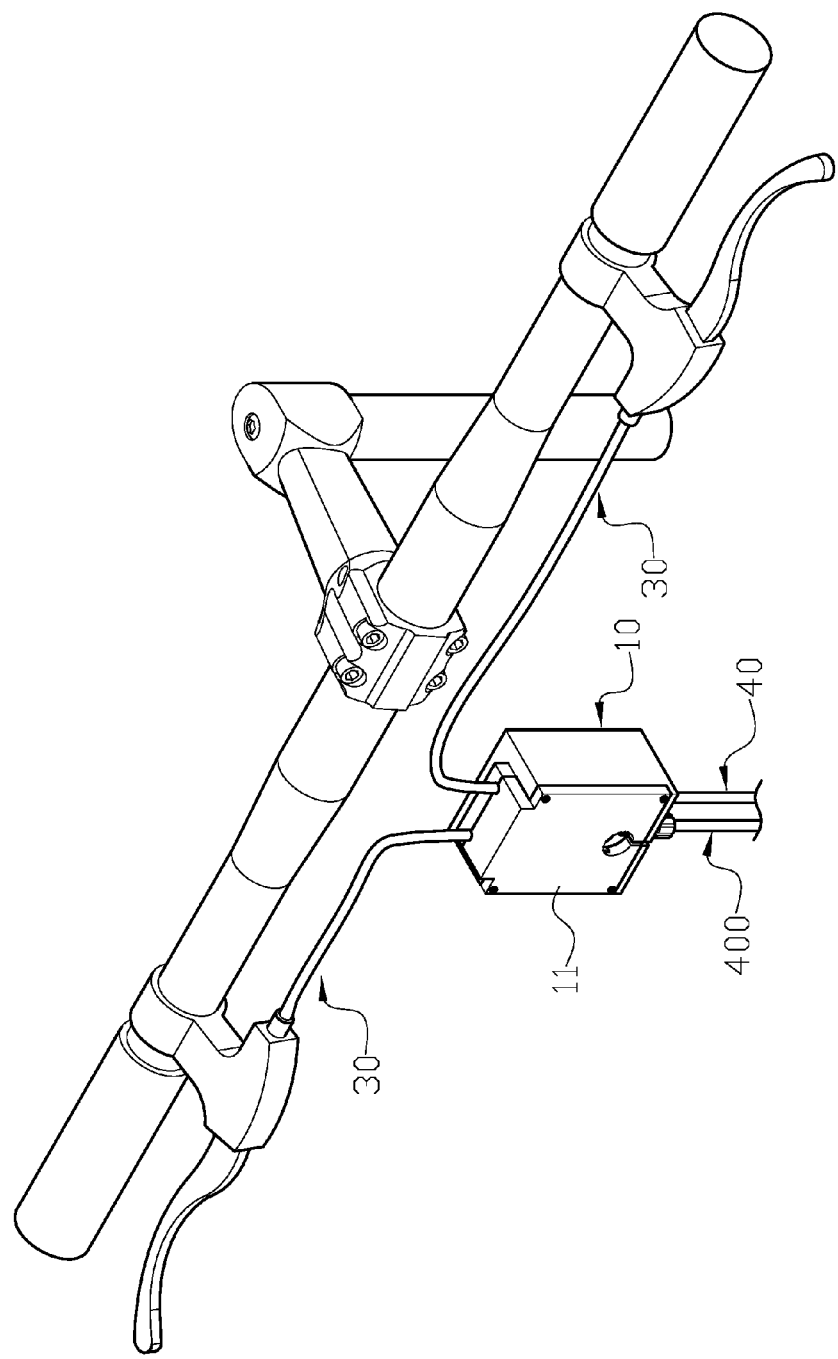
FIG. 6 is a schematic view illustrating the bicycle brake assisting apparatus of the present invention is installed on a bicycle.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a bicycle brake assisting apparatus which comprises a main body (10), a traction apparatus (20), two control cable members (30), a rear brake tube (40), and a front brake tube (400), and the traction apparatus (20) further comprises an operating block (21) and a rotating piece (22) which are pivotally connected with each other. The main body (10) has a front surface (101) and a rear surface (102), and the front surface (101) has a concave portion to form a compartment (103) inside the main body (10). After positioning the traction apparatus (20) into the compartment (103) and completing the installation of the control cable members (30), the rear brake tube (40), and the front brake tube (400), a cover (11) is coupled with the front surface (101) to close the compartment (103). Moreover, a vertical elongated second guiding groove (111) is formed at a central portion of the cover (11) on an inner surface thereof, and the main body (10) has a vertical elongated first guiding groove (104) formed on an inner surface of a rear wall thereof at a position corresponding to the second guiding groove (111). Two adjacent first through holes (105), which are parallel in a left-right direction vertically and downwardly penetrate through an upper portion of the main body (10) to communicate with the compartment (103). Furthermore, a second through hole (106) and a third through hole (107), which are adjacent in a front-rear direction, vertically and respectively penetrate through a central portion of the main body (10) to communicate with the compartment (103). The operating block (21) has a front end (211) and a rear end (212), and a central shaft (213) protrudes from a central portion of the front end (211) and a central portion of the rear end (212) concurrently. When the operating block (21) is positioned into the compartment (103) of the main body (10), the central shaft (213) is configured to couple with the first guiding groove (104) and the second guiding groove (111), thus installing the operating block (21) in the compartment (103). Since a position of the operating block (21) is limited by the first guiding groove (104) and the second guiding groove (111), the operating block (21) is configured to have limited upward and downward movements inside the compartment (103). In addition, two first engaging holes (214) are formed on a top edge of the operating block (21) at both sides of a central portion of the top edge, and a bottom edge of the operating block (21) has a second engaging hole (215). Two cutting edges (216) formed at a lower portion of the operating block (21) are respectively located at both sides of the second engaging hole (215). An elongated hole (221) horizontally penetrates the rotating piece (22), and wherein the elongated hole (221) is vertically extended from a central portion of the rotating piece (22) toward an upper portion thereof. Additionally, the rotating piece (22) has a third engaging hole (222) formed at a lower edge thereof. The elongated hole (221) is configured to be penetrated through by the central shaft (213) such that the rotating piece (22) is configured to pivotally connect with the operating block (21) inside the compartment (103) of the main body (10). Moreover, the rotating piece (22) is configured to couple against the front end (211) of the operating block (21) and to locate at a position adjacent to the cover (11). Each of the two control cable members (30) has a control cable (31) penetrating therethrough from one end to the other end, and each of the two control cables (31) is connected to a brake lever at one end. Furthermore, the other end of the control cable (31) is configured to penetrate through the first through hole (105) of the main body (10) into the compartment (103) and to engage with the first engaging hole (214) of the operating block (21). The rear brake tube (40) comprises a rear brake wire (41) penetrating therethrough from one end to the other end, and one end of the rear brake wire (41) is connected to a rear brake while the other end thereof is configured to penetrate through the second through hole (106) of the main body (10) into the compartment (103) and to engage with the second engaging hole (215) of the operating block (21). The front brake tube (400) has a front brake wire (401) penetrating therethrough from one end to the other end, and one end of the front brake wire (401) is connected to a front brake while the other end thereof is configured to penetrate through the third through hole (107) into the compartment (103) and to engage with the third engaging hole (222) of the rotating piece (22).

In one embodiment, the main body (10), the cover (11), the traction apparatus (20), the control cable members (30), the rear brake tube (40), and the front brake tube (400) are configured to be selectively installed on a bicycle according to needs of a purchaser before the bicycle leaving the factory.

In another embodiment, the main body (10), the cover (11), the traction apparatus (20), the two control cable members (30) are configured to install on a bicycle, which has left the factory or is used. The installation process is to reconnect an end of an original rear brake tube (40) which is connected to a first brake lever of the bicycle to the operating block (21), and keep another end of the original rear brake tube (40) connect to a rear brake of the bicycle; similarly, to reconnect an end of an original front brake tube (400) which is connected to a second brake lever of the bicycle to the rotating piece (22), and keep another end of the original front brake tube (400) connect to a front brake of the bicycle; and to respectively connect the two control cable members (30) to the first brake lever and the second brake lever, thus completing the installation process.

In still another embodiment, each of the second through hole (106) and the third through hole (107) is engaged with an adjusting bolt (12), and the two adjusting bolts are configured to slightly adjusting degrees of tightening of the rear brake wire (41) and the front brake wire (401) respectively.

In a further embodiment, a first opening (108) horizontally penetrating through the rear wall of the main body (10) is formed at a lower end of the first guiding groove (104), and a second opening (112) horizontally penetrating through the cover (11) is formed at a lower end of the second guiding groove (111).

In still a further embodiment, the cover (105) and the main body (10) respectively have two corresponding half parts of the two first through holes (105), and the two first through holes (105) are formed between the cover (11) and the main body (10) when the cover (11) is coupled with the main body (10).

Figure 7:
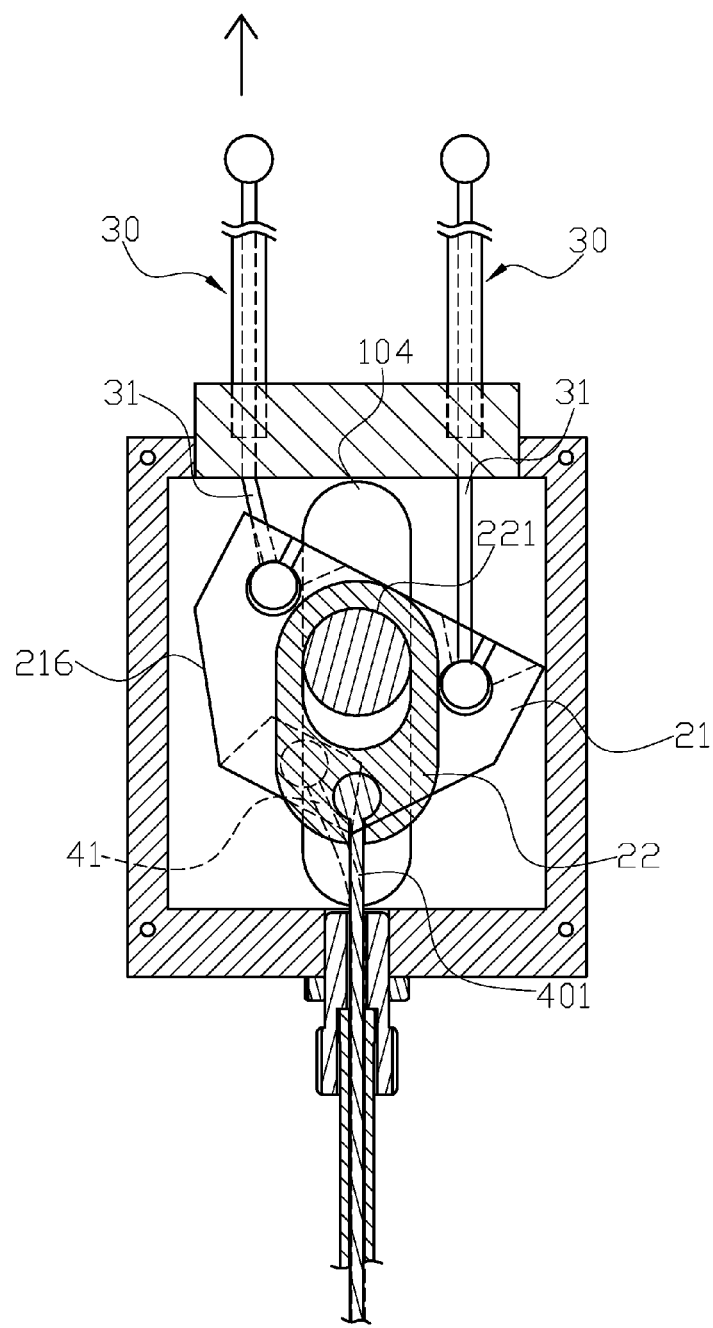
FIG. 7 is a schematic view of the bicycle brake assisting apparatus of the present invention when a right brake lever of the bicycle pulled.
Figure 8:
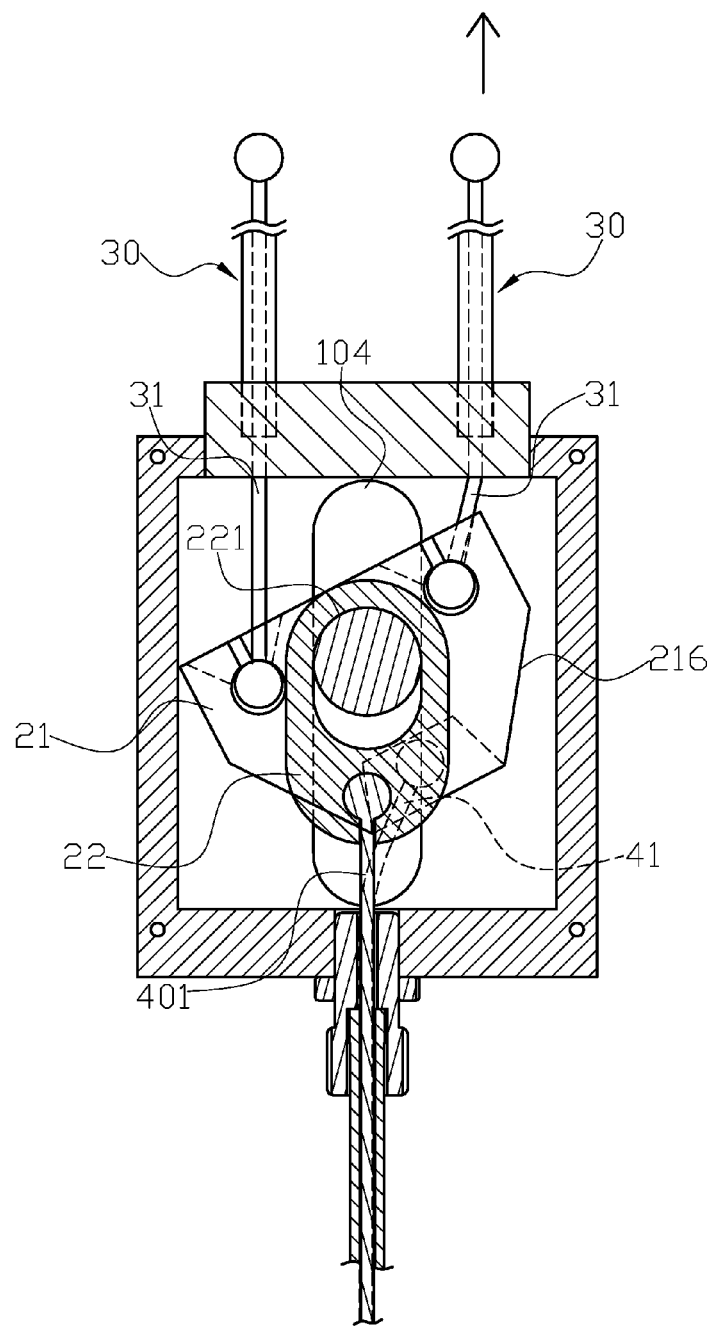
FIG. 8 is a schematic view of the bicycle brake assisting apparatus of the present invention when a left brake lever of the bicycle pulled.
Figure 9:
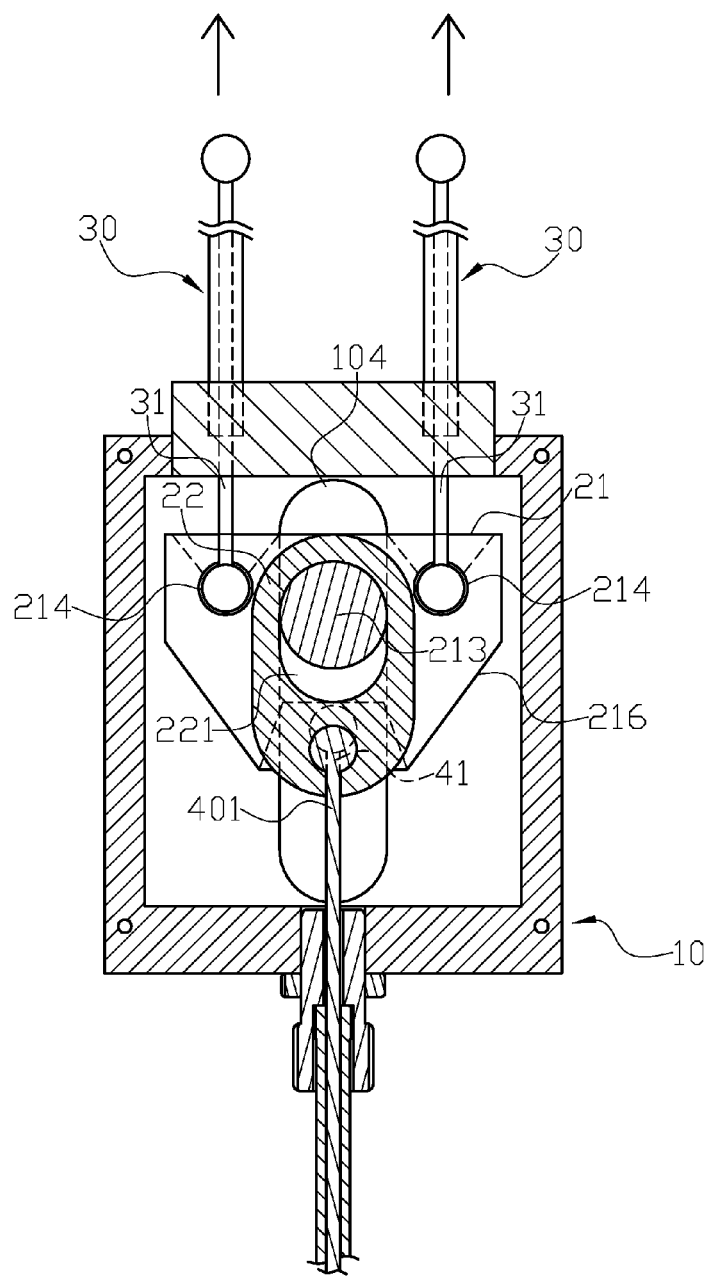
FIG. 9 is a schematic view of the bicycle brake assisting apparatus of the present invention when the left brake lever and the right brake lever of the bicycle pulled concurrently.
Figure 10:
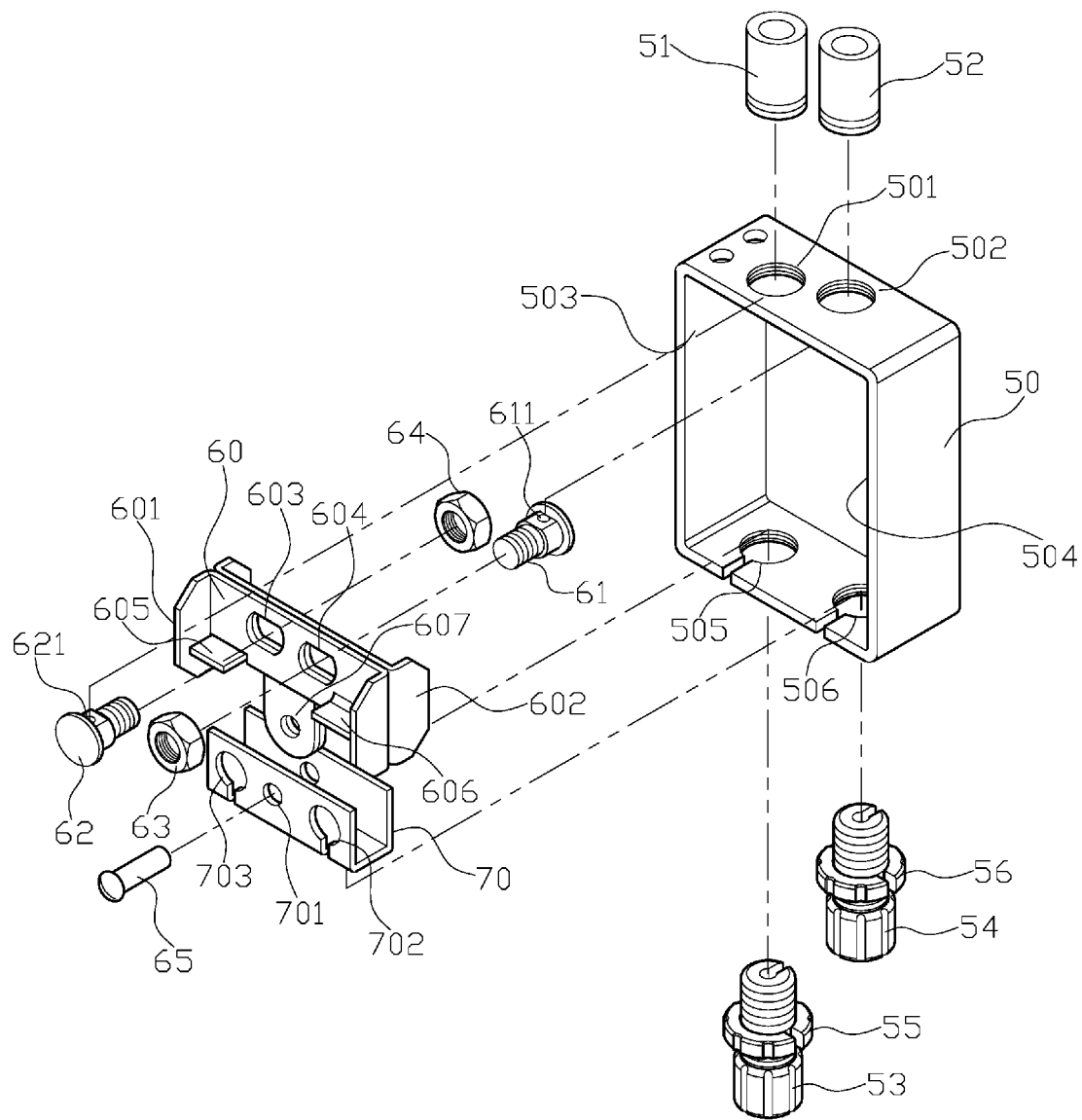
FIG. 10 is a prior art.
Figure 11:
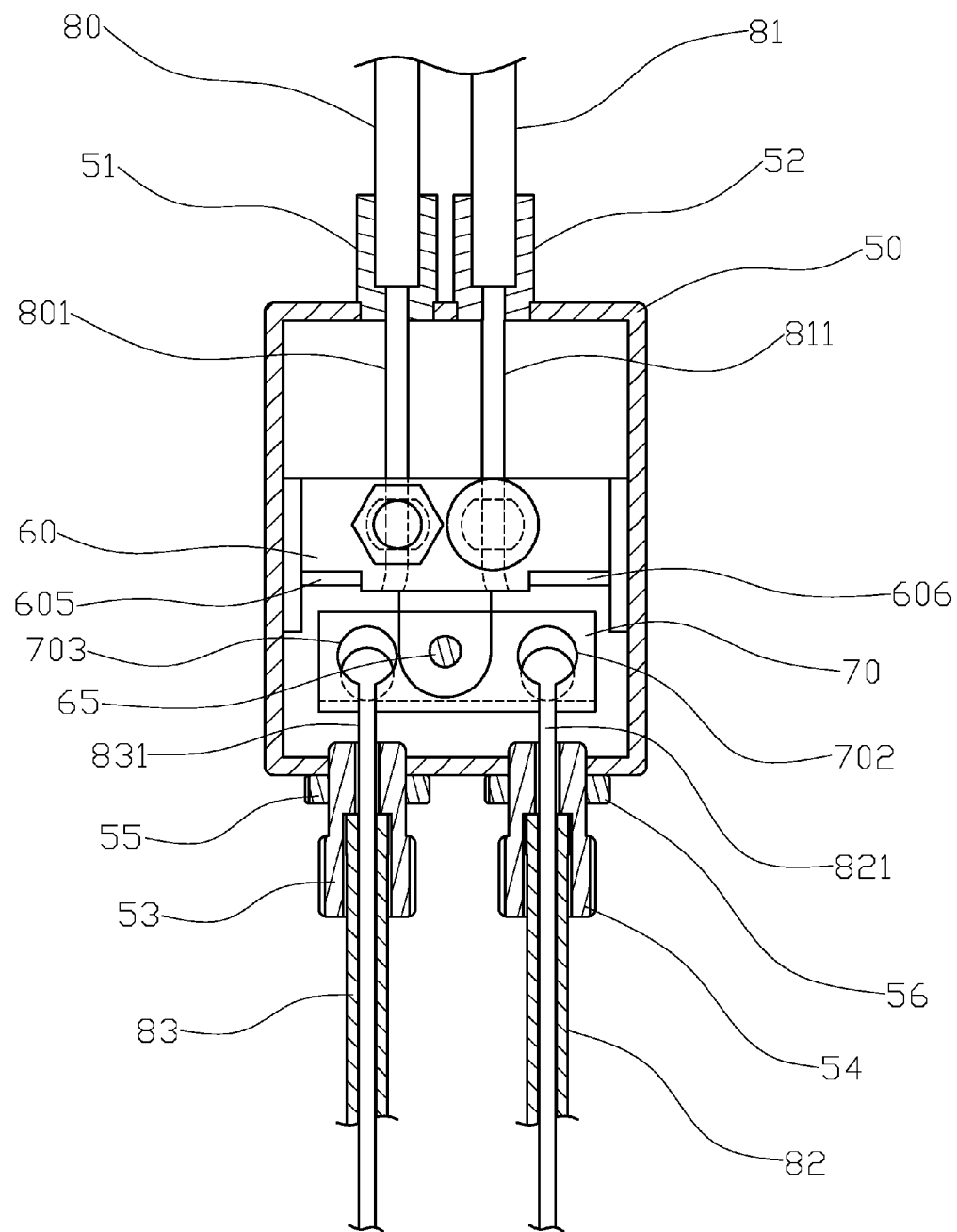
FIG. 11 is a prior art.
Figure 12:
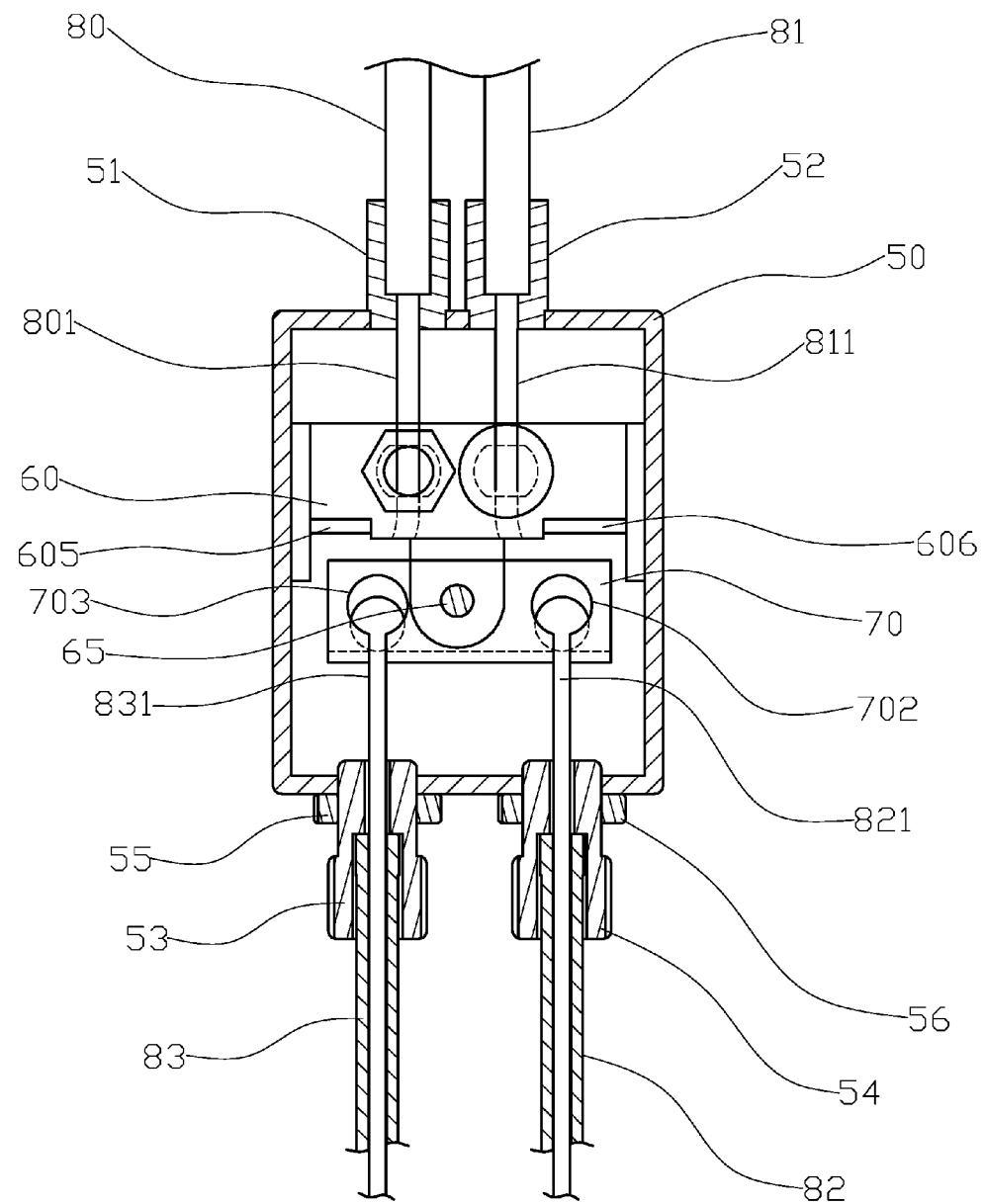
FIG. 12 is a prior art.

In actual application, when a user pulls the right brake lever of a bicycle which is installed with the bicycle brake assisting apparatus of the present invention, the control cable (31) connected to the right brake lever is configured to pull and allow a right side of the operating block (21) upwardly (as shown in FIG. 7). Because of the angular difference of operating block (21) and a deferring effect of the elongated hole (221), the rear brake wire (41) is configured to firstly be pulled upward, and when the user keep pulling the right brake lever, the operating block (21) is configured to drive the rotating piece (22) to move upwardly, thus allowing the front brake wire (401) to be pulled thereafter. With the time difference between pulling the rear brake wire (41) and the front brake wire (401), the bicycle brake assisting apparatus of the present invention is configured to stop a rear wheel of the bicycle first and to concurrently stop the rear wheel and a front wheel of the bicycle thereafter, thus preventing accidents. Moreover, the rotating piece (22) is pivotally connected with the operating block (21) such that the rotating piece (22) is guided with a direction when pulled upwardly. Otherwise, when the user pulls the left brake lever of the bicycle, the control cable (31) connected to the left brake lever is configured to pull and allow a left side of the operating block (21) upwardly (as shown in FIG. 8) to achieve the same braking effect of pulling the right brake lever; i.e. to stop the rear wheel first and concurrently stop the rear brake and the front wheel thereafter. Additionally, the cutting edges (216) are configured to prevent the operating block (21) from rubbing against the main body (10) when the right side or the left side thereof pulled upwardly or to prevent the operating block (21) from being stuck with the main body (10). Also, with the deferring effect of the elongated hole (221), when the left brake lever and the right brake lever are concurrently pulled (as shown in FIG. 9), the bicycle brake assisting apparatus of the present invention is still configured to achieve the effect of stopping the rear wheel of the bicycle first and concurrently stopping the rear wheel and the front wheel of the bicycle thereafter.

Comparing with conventional bicycle brake apparatus, the present invention is advantageous because: (i) when a user pulling either the left brake lever or the right brake lever, the operating block (21) is configured to smoothly be pulled upwardly without rubbing against or been stuck with the main body (10); (ii) with the pivotal connection between the main body (10) and the traction apparatus (20), the bicycle brake assisting apparatus of the present invention is configured to be assembled and dissembled simply and quickly, thus reducing the cost of use; (iii) the bicycle brake assisting apparatus of the present invention is configured to achieve the effect of stopping the rear wheel of the bicycle first and concurrently stopping the rear wheel and the front wheel of the bicycle thereafter, thus increasing safety of use for a cyclist; (iv) the bicycle brake assisting apparatus of the present invention is configured to achieve the same effect mentioned in (iii) regardless of pulling the left brake lever, the right brake lever, or both of the brake levers; and (v) with pivotally connected with the operating block (21), the rotating piece (22) is configured to be guided with a direction when pulled upwardly, thereby preventing the front brake wire (401) from being pulled toward a side direction and the damage of components.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A bicycle brake assisting apparatus comprising a main body, a traction apparatus, two control cable members, a rear brake tube, and a front brake tube;
   wherein the main body has a front surface and a rear surface, and the front surface further comprises a concave portion to form a compartment inside the main body; after positioning the traction apparatus into the compartment and completing the installation of the control cable members, the rear brake tube, and the front brake tube, a cover is coupled with the front surface to close the compartment; a vertical elongated second guiding groove is formed at a central portion of the cover on an inner surface thereof, and the main body has a vertical elongated first guiding groove formed on an inner surface of a rear wall thereof at a position corresponding to the second guiding groove; two adjacent first through holes, which are parallel in a left-right direction vertically and downwardly penetrate through an upper portion of the main body to communicate with the compartment; and a second through hole and a third through hole, which are adjacent in a front-rear direction, vertically and respectively penetrate through a central portion of the main body to communicate with the compartment;
   wherein the traction apparatus comprises an operating block and a rotating piece which are pivotally connected with each other, and the operating block further has a front end and a rear end, and a central shaft protrudes from a central portion of the front end and a central portion of the rear end concurrently, when the operating block is positioned into the compartment of the main body, the central shaft is configured to couple with the first guiding groove and the second guiding groove, thus installing the operating block in the compartment; a position of the operating block is limited by the first guiding groove and the second guiding groove such that the operating block is configured to have limited upward and downward movements inside the compartment; two first engaging holes are formed on a top edge of the operating block at both sides of a central portion of the top edge, and a bottom edge of the operating block has a second engaging hole; and two cutting edges formed at a lower portion of the operating block respectively are located at both sides of the second engaging hole;
   wherein the rotating piece has an elongated hole horizontally penetrating therethrough and extended from a central portion of the rotating piece toward an upper portion thereof; a third engaging hole is formed at a lower edge of the rotating piece; the elongated hole is configured to be penetrated through by the central shaft such that the rotating piece is configured to pivotally connect with the operating block inside the compartment of the main body, and the rotating piece is configured to couple against the front end of the operating block and to locate at a position adjacent to the cover;
   wherein each of the two control cable members has a control cable penetrating therethrough from one end to the other end, and each of the two control cables is connected to a brake lever at one end, and the other end of the control cable is configured to penetrate through the first through hole of the main body into the compartment and to engage with the first engaging hole of the operating block;
   wherein the rear brake tube comprises a rear brake wire penetrating therethrough from one end to the other end, and one end of the rear brake wire is connected to a rear brake while the other end thereof is configured to penetrate through the second through hole of the main body into the compartment and to engage with the second engaging hole of the operating block; and
   wherein the front brake tube has a front brake wire penetrating therethrough from one end to the other end, and one end of the front brake wire is connected to a front brake while the other end thereof is configured to penetrate through the third through hole into the compartment and to engage with the third engaging hole of the rotating piece.

2. The bicycle brake assisting apparatus of claim 1, wherein each of the second through hole and the third through hole is engaged with an adjusting bolt.

3. The bicycle brake assisting apparatus of claim 1, wherein a first opening horizontally penetrating through the rear wall of the main body is formed at a lower end of the first guiding groove, and a second opening horizontally penetrating through the cover is formed at a lower end of the second guiding groove.

4. The bicycle brake assisting apparatus of claim 1, wherein the cover and the main body respectively have two corresponding half parts of the two first through holes, and the two first through holes are formed between the cover and the main body when the cover coupled with the main body.

* * * * *